US012623642B2

(12) United States Patent     (10) Patent No.:   US 12,623,642 B2

Girgis     (45) Date of Patent:    May 12, 2026

(54) COLLISION AVOIDANCE/BRAKE SYSTEM

(71) Applicant: Wagih S. Girgis, Belleair Bluffs, FL (US)

(72) Inventor: Wagih S. Girgis, Belleair Bluffs, FL (US)

( * ) Notice: Subject to any disclaimer, the term of this patent is extended or adjusted under 35 U.S.C. 154(b) by 199 days.

(21) Appl. No.: 17/542,009

(22) Filed: Dec. 3, 2021

(65) Prior Publication Data

US 2023/0174028 A1     Jun. 8, 2023

(51) Int. Cl.
| | |
|---|---|
| B60T 7/22 | (2006.01) |
| B60T 7/06 | (2006.01) |
| B60T 13/565 | (2006.01) |

(52) U.S. Cl.
CPC .................................... B60T 7/22 (2013.01); B60T 7/06 (2013.01); B60T 13/565 (2013.01); *B60T 2201/022* (2013.01); *B60T 2270/10* (2013.01)

(58) Field of Classification Search
CPC . B60T 7/22; B60T 7/06; B60T 13/565; B60T 2201/022; B60T 2270/10; B60T 7/042; B60T 13/745
See application file for complete search history.

(56) References Cited

U.S. PATENT DOCUMENTS

| | | | | |
|---|---|---|---|---|
| 4,819,996 A * | 4/1989 | Belart | ...................... | B60T 8/449 |
| | | | | 60/554 |
| 2010/0140063 A1* | 6/2010 | Jang | ........................ | B60T 17/22 |
| | | | | 200/61.89 |
| 2011/0168504 A1* | 7/2011 | Lee | ........................... | B60T 7/22 |
| | | | | 188/106 P |
| 2012/0073286 A1* | 3/2012 | Takayama | ............. | B60T 13/745 |
| | | | | 60/538 |
| 2017/0361851 A1* | 12/2017 | Takeya | ............ | B60W 30/18181 |
| 2018/0050673 A1* | 2/2018 | D'sa | ........................ | B60T 8/58 |

FOREIGN PATENT DOCUMENTS

| | | | | |
|---|---|---|---|---|
| CN | 102717791 A | * | 10/2012 | |
| DE | 102005021845 A1 | * | 12/2005 | .......... B60T 8/17558 |
| DE | 102009024034 A1 | * | 8/2010 | ................ B60T 8/40 |

OTHER PUBLICATIONS

Machine Translation of DE102005021845A1 PDF File Name: "DE102005021845A1_Machine_Translation.pdf".*
Machine Translation of CN102717791A PDF File Name: "CN102717791A_Machine_Translation.pdf".*
Machine Translation of DE 102009024034 A1 PDF File Name: "DE102009024034A1_Machine_Translation.pdf" (Year: 2010).*

* cited by examiner

*Primary Examiner* — Grant Moubry
*Assistant Examiner* — Ruben Picon-Feliciano
(74) *Attorney, Agent, or Firm* — GrayRobinson, P.A.

(57)       ABSTRACT

A vacuum booster has a shiftable diaphragm within a fixed housing. The fixed housing has forward and rearward ends. A piston and a vacuum port extend through the forward end of the housing for air to flow to and from the fixed housing. A quantity of brake fluid is within a master cylinder. A sensor is adapted to send an electronic signal in response to identified potentially damaging movement. A motion imparter is adapted to be activated in response to the electronic signal. The motion imparter is adapted to shift the shiftable diaphragm forwardly from a retracted orientation to an advanced orientation to advance the piston and convey brake fluid to the brakes for stopping the vehicle independent of driver involvement.

4 Claims, 7 Drawing Sheets

240
*FIG. 11*
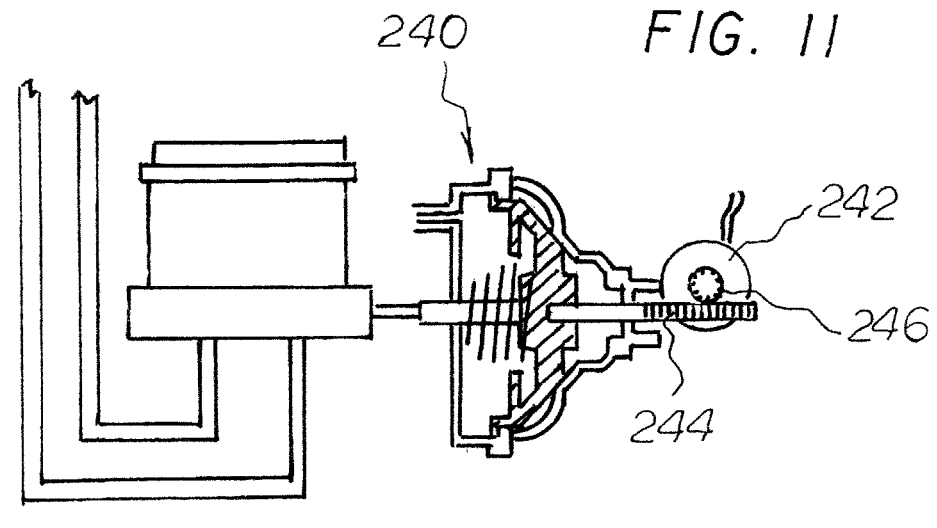
242
246
244
250
*FIG. 12*
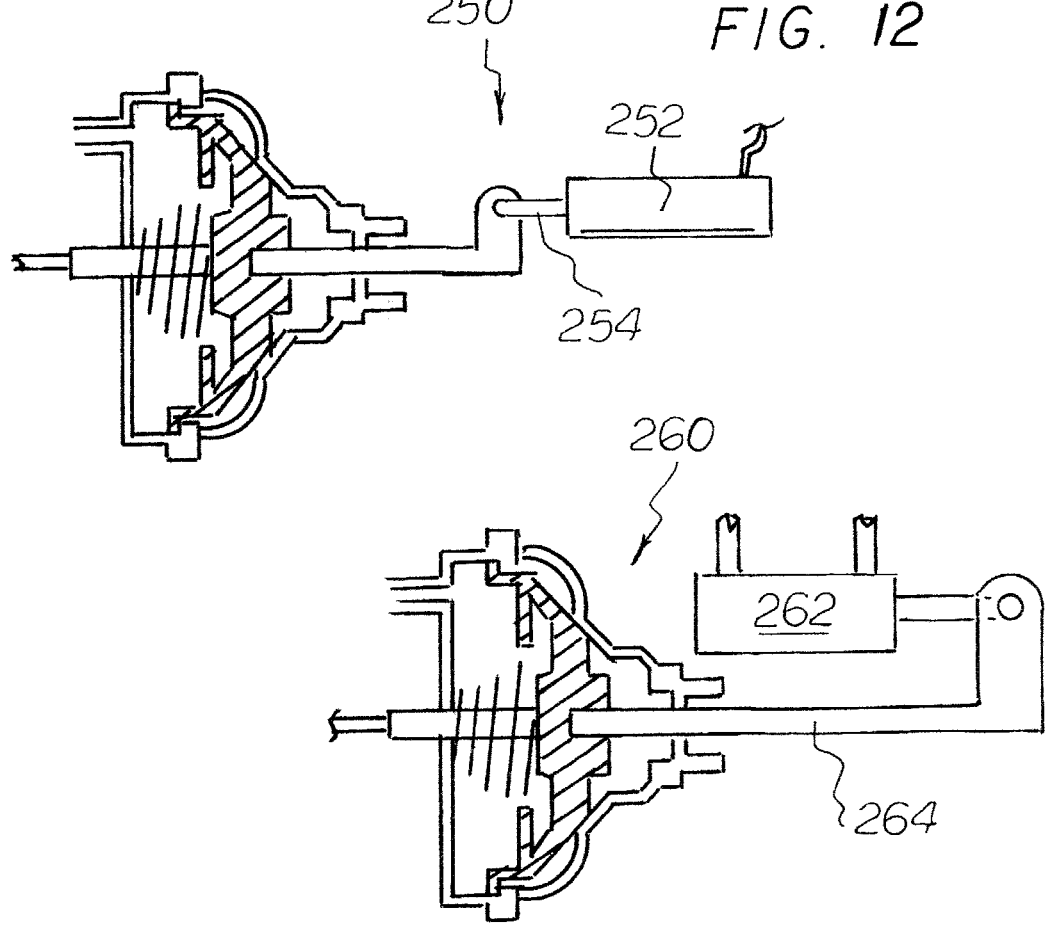
252
254
260
262
264
*FIG. 13*

COLLISION AVOIDANCE/BRAKE SYSTEM

BACKGROUND OF THE INVENTION

Field of the Invention

The present invention relates to a collision avoidance/ brake system and more particularly pertains to sensing a potential vehicle collision, braking the vehicle in response to the sensing, and stopping the vehicle prior to a collision, the sensing, the braking, and the stopping being done in safe, convenient, and economical manner without driver inter- vention.

SUMMARY OF THE INVENTION

In view of the disadvantages inherent in the known types of collision avoidance systems of known designs and con- figurations now present in the prior art, the present invention provides an improved collision avoidance/brake system. As such, the general purpose of the present invention, which will be described subsequently in greater detail, is to provide a new and improved collision avoidance/brake system and method which has all the advantages of the prior art and none of the disadvantages.

From a broad viewpoint, the present invention is a colli- sion avoidance/brake system. A vacuum booster is first provided. The vacuum booster has a fixed housing. The vacuum booster has a shiftable diaphragm within the fixed housing. The fixed housing has a forward end and a rearward end. A piston is provided. The piston extends through the forward end of the fixed housing. A vacuum port is provided. The vacuum port extends through the forward end of the fixed housing. In this manner air flows to and from the fixed housing. Further provided is a master cylinder. A quantity of brake fluid is provided within the master cylinder. A sensor is provided. The sensor is adapted to send an electronic signal in response to identified potentially damaging move- ment. A motion imparter is provided. The motion imparter is adapted to be activated in response to the electronic signal. The motion imparter is further adapted to shift the shiftable diaphragm forwardly from a retracted orientation to an advanced orientation. In this manner the piston advances and conveys brake fluid to the brake. Further in this manner the vehicle is stopped independent of driver involvement.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the draw- ings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construc- tions insofar as they do not depart from the spirit and scope of the present invention.

It is therefore an object of the present invention to provide a new and improved collision avoidance/brake system which has all of the advantages of the prior art collision avoidance systems of known designs and configurations and none of the disadvantages.

It is another object of the present invention to provide a new and improved collision avoidance/brake system which may be easily and efficiently manufactured and marketed.

It is a further object of the present invention to provide a new and improved collision avoidance/brake system which is of durable and reliable constructions.

An even further object of the present invention is to provide a new and improved collision avoidance/brake system which is susceptible of a low cost of manufacture with regard to both materials and labor, and which accord- ingly is then susceptible of low prices of sale to the con- suming public, thereby making such collision avoidance/ brake system economically available to the buying public.

Lastly, another object of the present invention is to provide a collision avoidance/brake system for sensing a potential vehicle collision, braking the vehicle in response to the sensing, and stopping the vehicle prior to a collision, the sensing, the braking, and the stopping being done in safe, convenient, and economical manner without driver inter- vention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

This invention will be better understood and objects other than those set forth above will become apparent when consideration is given to the following detailed description thereof. Such description makes reference to the annexed drawings wherein:

FIG. 11 is a side elevational view of another alternate embodiment of the invention configured for retrofit applications.

FIG. 12 is a side elevational view of yet another alternate embodiment of the invention configured for retrofit applications.

FIG. 13 is a side elevational view of yet another alternate embodiment of the invention configured for retrofit applications.

The same reference numerals refer to the same parts throughout the various Figures.

DESCRIPTION OF THE PREFERRED EMBODIMENT

Figure 1:
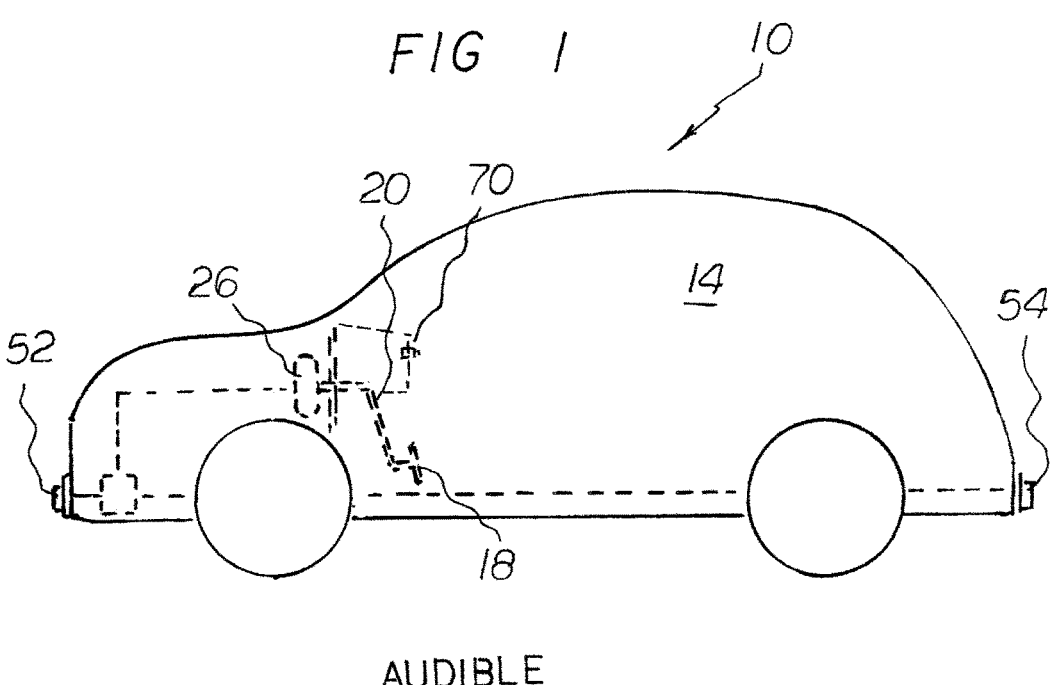
FIG. 1 is a side elevational view of a collision avoidance/ brake system constructed in accordance with the principles of the present invention.

With reference now to the drawings, and in particular to FIG. 1 thereof, the preferred embodiment of the new and improved collision avoidance/brake system embodying the principles and concepts of the present invention and generally designated by the reference numeral 10 will be described.

The present invention, the collision avoidance/brake system 10 is comprised of a plurality of components. Such components in their broadest context include a vacuum booster, a master cylinder, and a motion imparter. Such components are individually configured and correlated with respect to each other so as to attain the desired objective.

From a specific viewpoint, the present invention is a collision avoidance/brake system. First provided is a vehicle 14. The vehicle has a brake assembly 16. The brake assembly includes a driver controlled pedal 18. The brake assembly includes a lever 20. The lever supports the pedal. The brake assembly includes a rod 22. The rod is axially reciprocable in response to a driver depressing the pedal. In this manner the lever is pivoted. Further in this manner the rod is advanced.

A vacuum booster 26 is provided. The vacuum booster includes a fixed housing 28. The vacuum booster has a shiftable diaphragm 30. The shiftable diaphragm is fabricated of an elastomeric material chosen from the class including plastic and rubber, natural and synthetic, and blends thereof. The shiftable diaphragm is provided within the housing. The fixed housing has a forward end 32. The fixed housing has a rearward end 34. The rod extends through the rearward end of the fixed housing. The rod couples the shiftable diaphragm to the lever. A piston 36 is provided. The piston is located in a master cylinder and extends through the forward end of the housing. The piston is coupled to the shiftable diaphragm. A vacuum port 38 is provided. The vacuum port extends through the forward end of the housing and aids in the movement of the shiftable diaphragm.

Provided next is a master cylinder 42. A quantity of brake fluid is provided. The brake fluid is provided within the master cylinder. A reservoir 44 is provided. The brake fluid is provided in the reservoir. The reservoir is operatively coupled to the master cylinder. Four lines 46 are provided. The four lines are coupled to the master cylinder. The four lines are adapted to convey brake fluid from the master cylinder to brakes of the vehicle upon the driver depressing the pedal in order to stop the vehicle;

Further provided is an anti-lock braking system 50. The anti-lock braking system is a commercially available vehicle system which provides for applying the brakes of a vehicle without the brakes locking up. Provided next is a front sensor 52 and a rear sensor 54. The front sensor and the rear sensor are adapted to identify damaging movement of an adjacent vehicle. The identification of damaging movement prevents a resulting collision. Provided next is a processor 56. The processor is operatively coupled to the front sensor and to the rear sensor. The processor is adapted to send an electronic signal in response to identify potentially damaging movement.

Next provided is an electromagnet 58. The electromagnet is a motion imparting motor. Other motion imparting motors include solenoids, servos, linear actuators, rotary motors, and the like. By solenoid it is meant, as defined by Merriam-Webster, a coil of wire, usually in a cylindrical form, that when carrying a current acts like a magnet so that a movable core is drawn into the coil when current flows and that is used especially as a switch or control for a mechanical device.

The electromagnet has a positive pole 60. The electromagnet also has a negative pole 62. The positive pole is attached to the forward end of the housing. The negative pole is attached to the shiftable diaphragm of the housing. The electromagnet is adapted to be activated and the negative pole magnetically shifted from a retracted orientation to an advanced orientation. In this manner the piston is advanced. Also in this manner brake fluid is conveyed to the brakes. Further in this manner the vehicle is stopped without driver intervention.

A supplemental solenoid 64 functions to drive and impart motion to the rod and thereby move the shiftable diaphragm in response to a signal. Such supplemental solenoid functions in parallel with the electromagnet 58.

Figure 2:
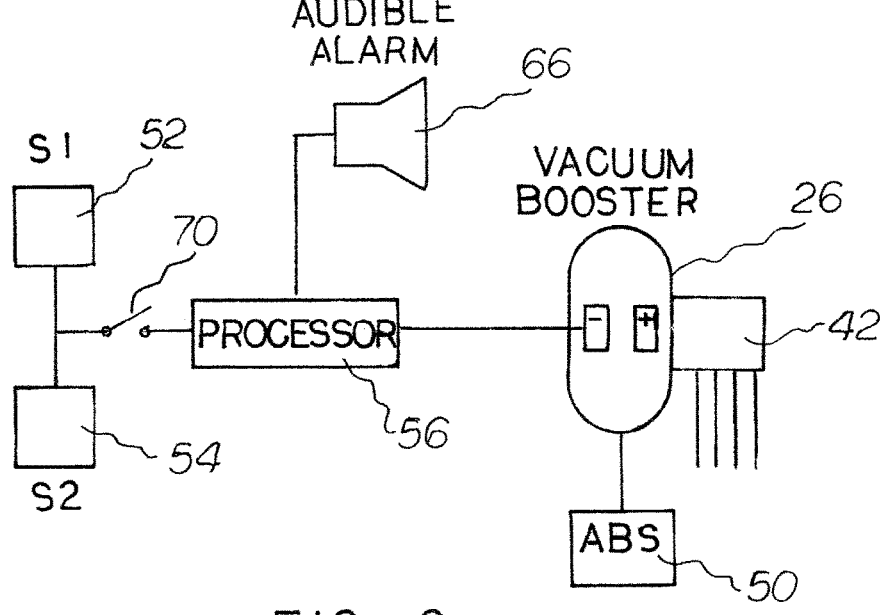
FIG. 2 is a schematic illustration of the system illustrated in FIG. 1.
Figures 3, 4:
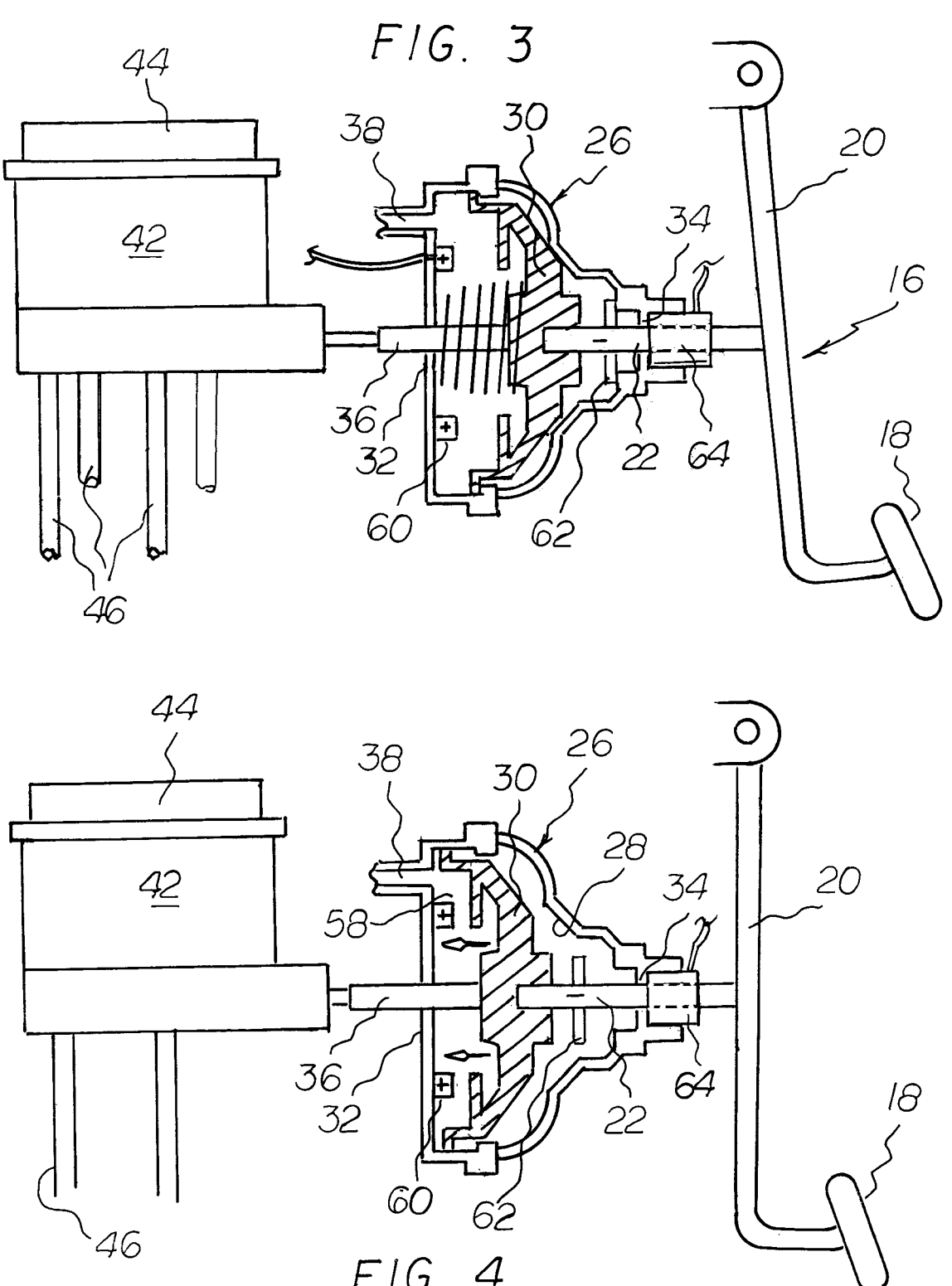
FIG. 3 is side elevational view, partially in cross section of a portion of the system of FIGS. 1 and 2.
FIG. 4 is a side elevational view similar to FIG. 3 but with the pedal depressed.

Provided last is an audible alarm 66, normally provided as original equipment in newer vehicles. The audible alarm is operatively coupled to the processor. In this manner an audible sound of warning to the driver is generated upon the sending of the electronic signal. Note FIG. 2. In association with the components as described herein, there is also provided a switch 70. Such switch is located on the dashboard under control of a driver. Such switch is an ON/OFF switch whereby the system of the present invention may be activated or inactivated by the driver.

Figures 5, 6:
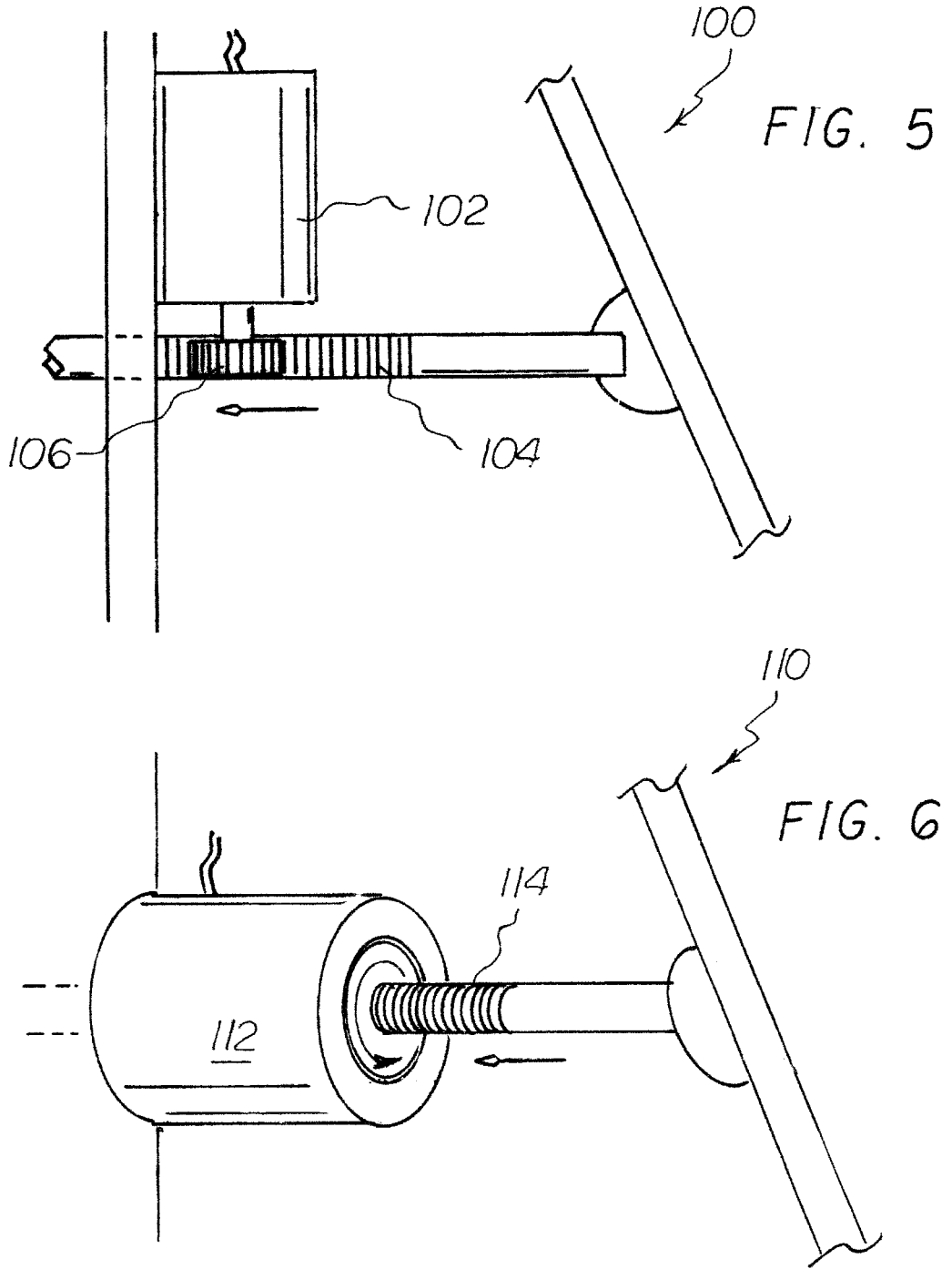
FIG. 5 is a side elevational view of an alternate embodi- ment of the invention, the embodiments of FIGS. 5-9 are configured chiefly for retrofit applications, not for original equipment.
FIG. 6 is a side elevational view of a third embodiment of the invention.

An alternate embodiment of the invention is shown in FIG. 5. In this alternate embodiment, the motor in the collision avoidance/brake system 100 is an electric motor 102. The motor has a rack 104. The motor has a pinion 106. The rack is formed in the rod. The rack is axially shiftable with the rod. The pinion is rotatable on the electric motor.

Another alternate embodiment of the invention is shown in FIG. 6. In this alternate embodiment, the motor in the collision avoidance/brake system 110 is an electric motor 112. In this embodiment, male screw threads 114 are formed in the rod. The male screw threads are axially shiftable with the rod by the electric motor.

Figures 7, 8:
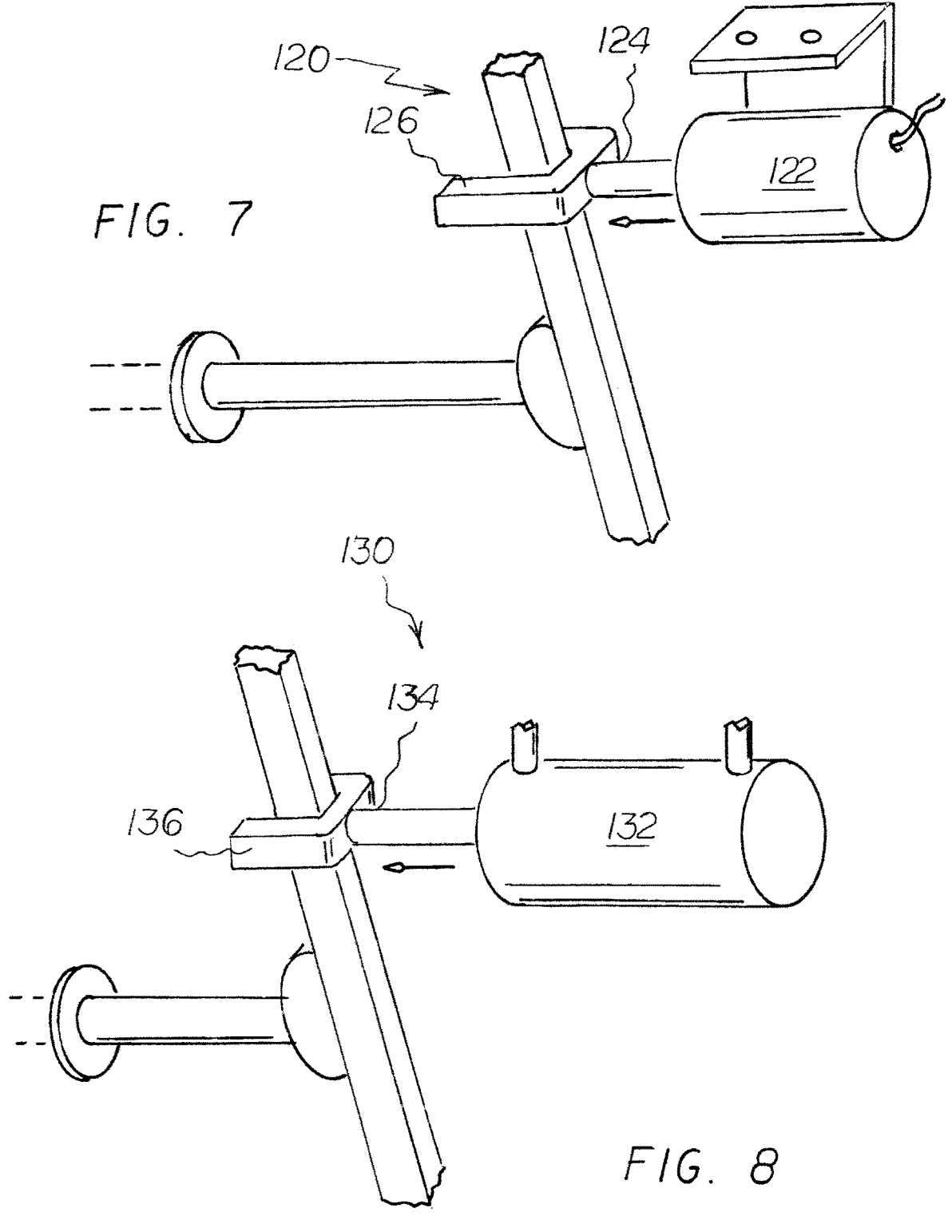
FIG. 7 is a side elevational view of a fourth alternate embodiment of the invention.
FIG. 8 is a side elevational view of an a fifth embodiment of the invention.

The next alternate embodiment of the invention is shown in FIG. 7. In this alternate embodiment, the motor in the system 120 is a solenoid 122. A fork-shaped connector 124 is provided. The fork-shaped connector has a back end coupled to the solenoid. The fork-shaped connector has a forked front 126 coupled to the lever. The fork-shaped connector and the lever are shiftable by the solenoid.

The next alternate embodiment of the invention is shown in FIG. 8. In this alternate embodiment, the motor in the collision avoidance/anti-lock braking system 130 is a pneumatic cylinder 132. A fork-shaped connector 134 has a back end coupled to the pneumatic cylinder. The fork-shaped connector has a forked front 136 coupled to the lever. The fork-shaped connector and the lever are shiftable by the pneumatic cylinder.

Figures 9, 10:
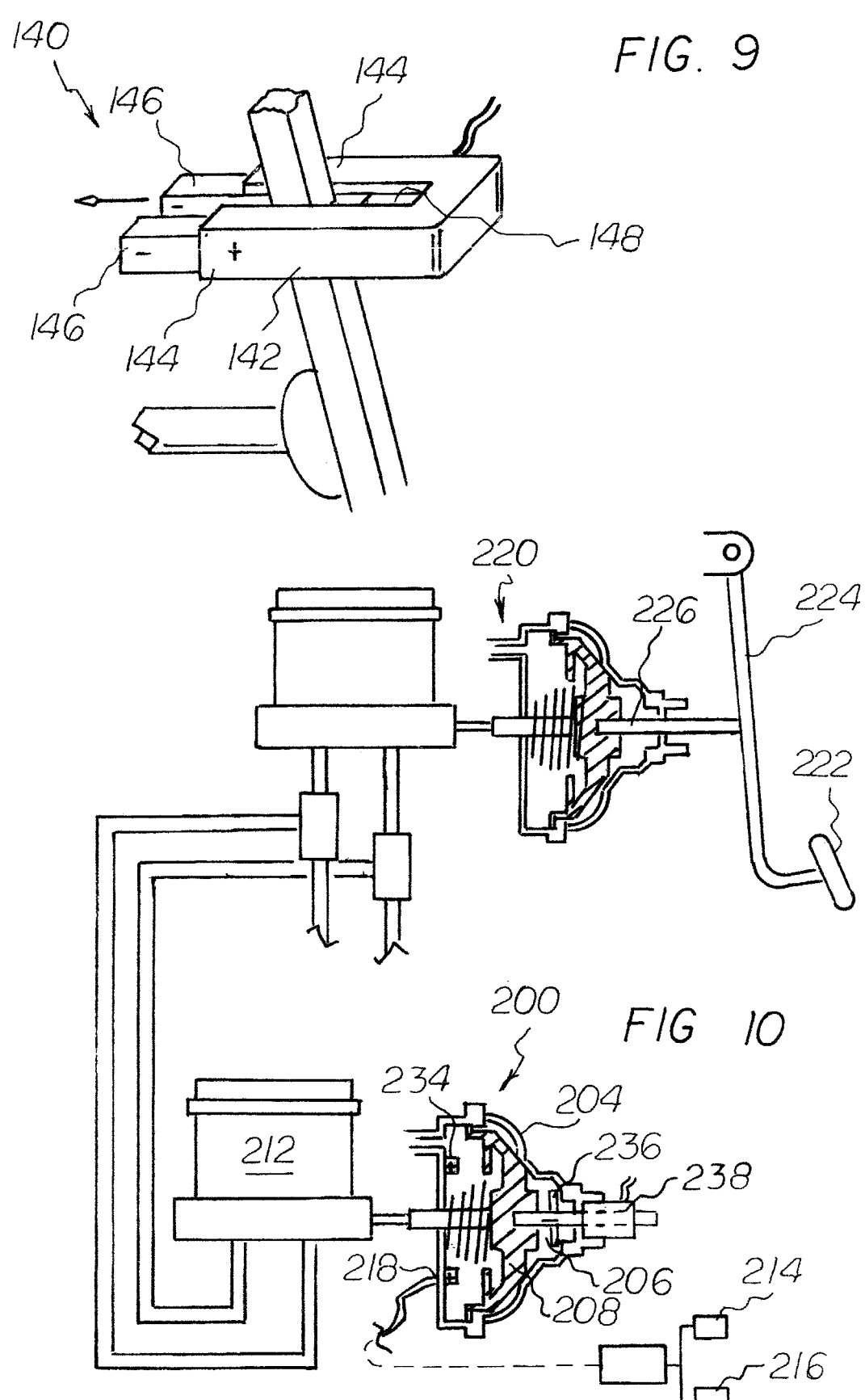
FIG. 9 is a perspective view of a sixth embodiment of the invention.
FIG. 10 is a side elevational view of an alternate embodiment of the invention, the embodiments of FIGS. 10-13 are configured chiefly for original equipment, not for retrofit applications.

The next alternate embodiment of the invention is shown in FIG. 9. In this alternate embodiment, the motor in the collision avoidance/anti-lock braking system 140 is a horseshoe-shaped magnet 142. The horseshoe-shaped magnet has hollow parallel legs 144. The hollow parallel legs constitute a positive pole of an electromagnet. The horseshoe-shaped magnets further include linear negative poles 146. The linear negative poles are slidably received in the hollow parallel legs. The horseshoe-shaped magnet has a forked center 148 coupled to the lever. The horseshoe-shaped magnet and the lever are shiftable by the electronic signal.

Figure 14:
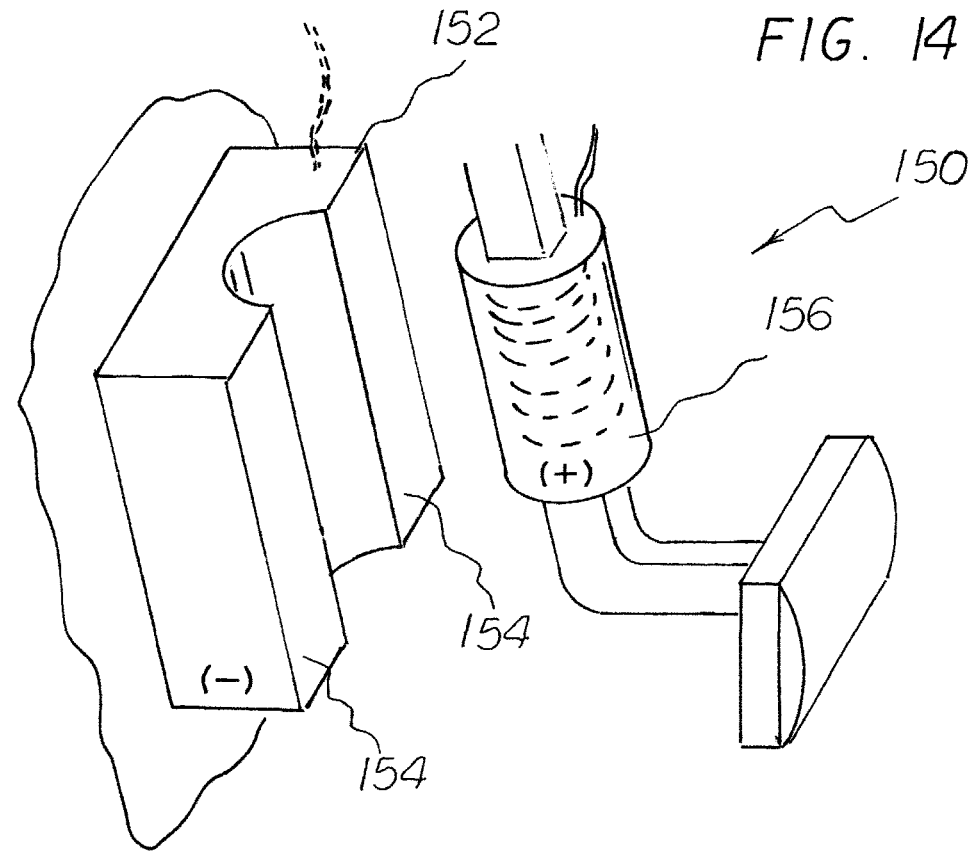
FIG. 14 is a perspective illustration of an alternate embodiment of the invention configured for retrofit applications as well as for original equipment applications.

The next alternate embodiment of the invention is shown in FIG. 14. In this alternate embodiment, the motor in the collision avoidance/automatic braking system 150 is a C-shaped magnet 152. The C-shaped magnet has free ends 154. The free ends constitute a negative pole of an electromagnet. The C-shaped magnet further includes a linear positive pole 156. The linear positive pole is secured to the lever. The linear positive pole and the lever are shiftable by the electronic signal.

Another alternate embodiment of the invention is shown in FIGS. 10-13. In this alternate embodiment, the collision avoidance/brake system 200 includes a primary vacuum booster 204. The primary vacuum booster has a primary fixed housing 206 and a primary shiftable diaphragm 208 within the fixed housing. The fixed housing has a forward end and a rearward end. A piston is provided. The piston extends through the forward end of the fixed housing. A vacuum port is provided. The vacuum port extends through the forward end of the fixed housing. In this manner air flows to and from the fixed housing.

A primary master cylinder 212 is provided. The primary master cylinder has a quantity of brake fluid. The quantity of brake fluid is provided within the master cylinder. A sensor 214, 216 is provided. The sensor is adapted to send an electronic signal in response to identified potentially damaging movement. In association therewith is a motor 218. The motion imparter is adapted to be activated in response to the electronic signal. The motion imparter is further adapted to shift the shiftable diaphragm forwardly from a retracted orientation to an advanced orientation. In this manner the piston is advanced. Also in this manner brake fluid is conveyed to the brakes. Further in this manner the vehicle is stopped independent of driver involvement.

Further provided is a secondary automatic braking system 220. The secondary braking system includes a driver controlled pedal 222. A lever 224 is provided. The lever supports the pedal. A rod 226 is provided. The rod is axially reciprocable in response to a driver depressing the pedal. In this manner the lever pivots and the rod reciprocates. Also in this manner the shiftable diaphragm shifts forwardly from a retracted orientation to an advanced orientation. Further in this manner the piston is advanced and brake fluid is conveyed to the brakes through driver involvement.

In the embodiment shown in FIG. 10, the motion imparter in the collision avoidance/automatic braking system 65 includes an electromagnet. The electromagnet has positive pole 234 and a negative pole 236. The positive pole is attached to the forward end of the housing. The negative pole is attached to the shiftable diaphragm of the housing.

A supplemental solenoid 238 functions to drive and impart motion to the rod and thereby move the shiftable diaphragm in response to a signal. Such supplemental solenoid functions in parallel with the electromagnet.

In the embodiment shown in FIG. 11, the motion imparter in the collision avoidance/brake system 240 is an electric motor 242. The electric motor has a rack 244 and a pinion 246. The rack is formed in the rod and is axially shiftable with the rod. The pinion is rotatable on the electric motor.

In the embodiment shown in FIG. 12, the motion imparter in the collision avoidance/automatic braking system 250 is a servo motor 252. The servo motor includes a pushing piston 254 attached to the rod. The piston and rod are axially shiftable by the servo motor.

In the final embodiment shown in FIG. 13, the motion imparter in the collision avoidance/brake system 260 is a pulling pneumatic cylinder 262. The pneumatic cylinder includes a piston 264 attached to the rod. The piston and rod are axially shiftable by the pneumatic cylinder.

A high percentage of vehicles today are equipped with cruise control, a feature which maintains the vehicle at a desired speed until the brakes are applied. The present invention is readily adapted to be used in vehicles with cruise control. When equipped with cruise control, vehicles with the present invention will inactivate the cruise control when brakes are applied with or without driver involvement. Re-setting of the cruise control will then be required.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A collision avoidance and brake system (10) for sensing a potential vehicle collision, braking the vehicle in response to the sensing, and stopping the vehicle prior to a collision, the sensing, the braking, and the stopping being done without driver intervention, the system comprising:

a vehicle (14) having a brake assembly (16), the brake assembly including brakes, a driver controlled pedal (18), a lever (20) supporting the pedal, a rod (22) axially reciprocable in response to the driver depressing the pedal (18) and thereby pivoting the lever (20) and advancing the rod (22);

a vacuum booster (26) including a fixed housing (28) and a shiftable diaphragm (30) within the fixed housing (28), the fixed housing (28) having a forward end (32) and a rearward end (34), the rod (22) extending through the rearward end of the fixed housing (28) and coupling the shiftable diaphragm (30) to the lever (20), thereby allowing diaphragm (30) to be shifted in response to the driver depressing the pedal (18), a vacuum port (38) extending through the forward end of the fixed housing (28) for exhausting air from the fixed housing (28) in response to forward movement of the shiftable diaphragm (30);

a supplemental solenoid (64) positioned within the fixed housing (28) and functioning to drive the rod (22) and move the shiftable diaphragm (30) in response to a signal;

a master cylinder (42), a quantity of brake fluid within the master cylinder (42), a reservoir (44) of brake fluid operatively coupled to the master cylinder (42), four lines (46) coupled to the master cylinder (42), the four lines adapted to convey brake fluid from the master cylinder (42) to the brakes of the vehicle upon the driver depressing the pedal (18) to stop the vehicle (14);

an anti-lock braking system (50) whereby when the brakes of the vehicle are applied, with or without driver intervention, a rapidly pulsating application of force will abate the locking up of the brakes;

a front sensor (52) and a rear sensor (54), the front sensor (52) and the rear sensor (54) adapted to identify damaging movement of an adjacent vehicle which if unchecked would result in a collision, a processor (56) operatively coupled to the front sensor (54) and to the rear sensor (54) adapted to send an electronic signal in response to identify potentially damaging movement, an electromagnet (58) with a positive pole (60) and a negative pole (62), the positive pole being attached to the forward end of the fixed housing (28), the negative pole being attached to the rod (22) and the shiftable diaphragm (30) of the fixed housing (28), the electromagnet (58) adapted to be activated and the negative pole magnetically shifted from a retracted orientation to an advanced orientation to advance the rod (22) and convey brake fluid to the brakes for stopping the vehicle (14) without driver intervention;

an audible alarm (66) in the vehicle, the audible alarm operatively coupled to the processor to generate an audible sound of warning to the driver upon the sending of the electronic signal; and an ON/OFF switch (70) under control of a driver whereby the system (10) may be activated or inactivated at the discretion of the driver.

2. A collision avoidance/brake system (200) for a vehicle (14) having brakes, the system (200) comprising:

a primary vacuum booster (204) having a primary fixed housing (206) and a primary shiftable diaphragm (208) within the primary fixed housing (206), the primary fixed housing (206) having a forward end and a rearward end, a piston (36) extending through the forward end of the primary fixed housing (206), a vacuum port (38) extending through the forward end of the primary fixed housing (206) for the flow of air to and from the primary fixed housing (206); and a primary master cylinder (212), a quantity of brake fluid within the primary master cylinder (212), sensors (214) (216) adapted to send an electronic signal in response to identified potentially damaging movement;

an electromagnetic motion imparter (218) in the form of an electromagnet that is physically interconnected to the primary shiftable diaphragm (208), the electromagnetic motion imparter adapted to be activated in response to the electronic signal and shift the primary shiftable diaphragm (208) forwardly from a retracted orientation to an advanced orientation and convey brake fluid to the vehicle brakes for stopping independent of driver involvement, the electromagnet including a positive pole (234) and a negative pole (236), the positive pole being attached to the forward end of the primary fixed housing, the negative pole being attached to the shiftable diaphragm of the primary fixed housing;

a secondary brake assembly (220), the secondary brake assembly including a driver controlled pedal (222), a lever (224) supporting the pedal, a rod 226 axially reciprocable in response to the driver depressing the pedal (222) thereby pivoting the lever (224) and advancing the rod (226) to shift the primary shiftable diaphragm (208) forwardly from a retracted orientation to an advanced orientation and thereby advance the rod (226) and convey brake fluid to the brakes through driver involvement.

3. The system (240) as set forth in claim 2 wherein the motion imparter is an electric motor (242) with a rack (244) and pinion (246), the rack being formed in the rod and being axially shiftable with the rod, the pinion being rotatable on the electric motor.

4. The system (250) as set forth in claim 2 wherein the motion imparter is a servo motor (252), the servo motor including a piston (254) attached to the rod, the piston and the rod being axially shiftable by the servo motor.

* * * * *